United States Patent [19]

Belttary

[11] Patent Number: 4,468,547
[45] Date of Patent: Aug. 28, 1984

[54] BUS BAR CONNECTOR SYSTEM

[75] Inventor: Harold E. Belttary, Colinas de Monte Carlo, P.R.

[73] Assignees: Challenger Caribbean Corporation, Canovanas, P.R.; Commander Electrical Equipment, Inc., Scarborough, Canada

[21] Appl. No.: 461,410

[22] Filed: Jan. 27, 1983

[51] Int. Cl.³ .............................................. H01H 9/08
[52] U.S. Cl. ................................ 200/294; 339/262 F; 361/355
[58] Field of Search .............................. 200/294, 295; 339/262 F, 262 R; 361/353, 355

[56] References Cited

U.S. PATENT DOCUMENTS

| | | | |
|---|---|---|---|
| 2,145,165 | 1/1939 | Douglas | 339/262 R X |
| 3,389,307 | 6/1968 | Locher et al. | 200/294 X |
| 3,423,723 | 1/1969 | Kobryner | 339/262 F X |
| 3,463,967 | 8/1969 | Klein | 200/294 X |
| 4,181,924 | 1/1980 | Thomas et al. | 361/353 |

*Primary Examiner*—John W. Shepperd
*Assistant Examiner*—Renee S. Kidorf
*Attorney, Agent, or Firm*—Sperry, Zoda & Kane

[57] ABSTRACT

Each of a pair of low voltage, residential type circuit breaker housings includes a molded case, a mating cover, a spring clip, and a conductive contact member. The clip, generally U-shaped, has a stiff outer leg with smoothly formed edges, a base, and an inner leg forming two flat springs joined by a flat leg coupled to the base. The flat leg is case supported to stabilize the base and outer leg. The member has an outer conductive leg so formed that when the clip's stiff outer leg's inner surface opposes a connecting surface thereof, and spaced therefrom, a bus bar blade is receivable. The contact member includes a step having a riser in one direction joining at a roundly formed right angle with one end of its leg (the roundly formed angle and smoothly formed edges serving as lead-in contours for a bus bar blade) and a tread along a second orthogonally oriented direction, which tread rests on one of the flat springs. The contact member includes a formed configuration having one portion coupled to the leg's other end and oriented parallel to the riser, a second portion coupled to the first portion extending in a third orthogonal direction but parallel to the riser, and a third portion coupled to and perpendicular to the second portion. The second portion has an aperture for receiving the other flat spring. A fixed contact can be housed on the second portion.

5 Claims, 20 Drawing Figures

BUS BAR CONNECTOR SYSTEM

BACKGROUND OF THE INVENTION

1. Field of the Invention

This invention relates to a bus bar connector system and, especially, to such systems for usage in low voltage, residential type circuit breakers. Accordingly, it is the general object of this invention to provide new and improved devices of such character.

2. General Background

A commonly manufactured variety of bus bar connector system in the past has featured a spring clip which is located on one end of a molded circuit breaker housing. The spring clip served as an electrical connector and as part of the mounting means of the circuit breaker. Typically, a molded recessed portion (termed a "heel") in the opposite end of the circuit breaker housing cooperated with a metal tab in a panel board to provide the other part of the mounting means.

Usually, electric circuit breakers were installed in a panel board by placing the heel of the molded housing under the metal tab and pivoting the circuit breaker thereabout in a rotating manner until the spring clip, secured within the circuit breaker housing, engaged an extending blade of a panel board bus bar. Deflection of the spring clip, as it was pressed onto the bus bar blade created an electrical contact force as well as a gripping force that contributed to holding the circuit breaker in place.

In general, electrical panel boards have been provided with a plurality of extended formed bus bar blades located on one inch centers for housing circuit breakers which were typically one inch wide. However, many manufacturers provide a family of residential circuit breakers, having the features described hereinabove, in which the circuit breakers have widths in one half inch increments so that two "half inch" circuit breakers may share a single bus bar blade or, alternatively, be placed between two bus bar blades. Thus, the panel board is adapted to accommodate both one inch wide breakers, half inch wide breakers and two inch wide two pole breakers.

To optimize the economical use of bus bar blades and to facilitate the planning of electric circuit protection, it is desirable to provide a half inch wide circuit breaker that is able to be mounted in a panel board in the manner described hereinabove. Various systems which have been developed in the past have various disadvantages. Some are costly, some are complicated and some are not reliable.

One disadvantage of a particular prior bus bar connector system was that a particular one half inch wide circuit breaker could not be installed on a bus bar blade that was already occupied by a mating circuit breaker. It was necessary to remove the installed breaker, couple it with its mate, and mount them simultaneously. Such inconvenience has brought about some user difficulty.

A family of low voltage residential type circuit breakers that has been commercially available include single pole and double pole constructions. The electrical contact force and connection integrity between such a double pole circuit breaker connector and an associated bus bar was dependent on a multiplicity of components and their respective manufacturing tolerances including, for example, a copper contact, a copper contact back-up spring, cases and covers of a four piece molded plastic housing, rivets that combine the case and cover of an individual pole of a two pole circuit breaker, and rivets that combine the two poles together to form a double pole circuit breaker.

3. Statement under 37 CFR 1.56

In compliance with a duty of candor and good faith to be maintained with the U.S. Patent and Trademark Office, the following patents are called to its attention, copies of which are forwarded thereto. Although applicant became aware of these patents by virtue of a preliminary novelty search performed on his behalf, this statement is not to be construed that a search has in fact been performed.

| Patentee | U.S. Pat. No. | Issue Date |
| --- | --- | --- |
| Douglas | 2,145,165 | Jan. 24, 1939 |
| Sanda | 2,617,844 | Nov. 11, 1952 |
| Gelzheiser et al | 3,333,078 | July 25, 1967 |
| Kobryner | 3,423,723 | Jan. 21, 1969 |
| Belttary | 4,351,583 | Sept. 28, 1982 |

U.S. Pat. No. 2,145,165 to Douglas discloses a terminal post and a spring wire wherein a plug conductor terminal is clamped between a wire and a conductor post.

U.S. Pat. No. 2,617,844 to Sanda discloses a wire connector including a spring member passing through and bending around a portion of a guide member, the connector having a conductive base.

U.S. Pat. No. 3,333,078 to Gelzheiser et al is included for its general showing wherein its housing, allegedly, does not affect the contact pressure between terminal and stab.

U.S. Pat. No. 3,423,723 to Kobryner discloses a spring which passes around a leg of a conductor wherein a blade would be held between a leg of the spring and a leg of the conductor with clamping action supplied by the spring.

U.S. Pat. No. 4,351,583 to Belttary discloses electrical terminal comprising an electrical contact and a reinforcing member. The electrical contact includes a strip of metal of flexible material having good electrical conductivity and having at least a portion formed as a generally U-shaped member having a bight portion and having spaced arms. The reinforcing member is resilient, generally U-shaped and is arranged substantially without the U-shaped member contact and embraces the arms.

SUMMARY OF THE INVENTION

Another object of this invention is to provide a new and improved bus bar connector system in which an individual half inch size breaker can be installed or removed independently without requiring such to be done with its mate.

Yet another object of this invention is to provide a new and improved bus bar connector system in which the electrical contact force and integrity thereof is dependent only upon a copper contact and a spring clip; the molded cases and covers and associated rivets do not contribute to a bus bar connector force and hence adverse accummulation of manufacturing tolerances of such components do not diminish the contact force and integrity of the new and improved bus bar connector system. Hence, an object of the invention herein is to provide for improved connector reliability by reducing the quantity of connector related parts in an electrical circuit breaker construction.

Still yet another object of this invention is to provide a new and improved bus bar connector system, the components of which are common to a family of circuit breakers including single pole, double single pole, twin and common trip constructions.

A further object of this invention is to provide a new and improved bus bar connector system which can be utilized with existing electrical circuit breaker packages with minimal expense.

In accordance with this invention, a bus bar connector system can be provided for a low voltage residential circuit breaker and can also be provided for a pair of low voltage residential type circuit breakers. Various aspects of the invention will be apparent from a specific detailed embodiment described hereinafter.

A specific embodiment of the invention concerns a bus bar connector system for a pair of low voltage, residential type circuit breakers comprising a first circuit breaker housing including a molded case and a mating cover. The molded case has an opening in the front thereof for an operating handle to pass therethrough, a molded depressed portion at one end of the back of the case, forming a partial heel, and a raised molded feature at the far opposite end of the back of the case. The mating cover has a molded recessed portion at one end of the back of the cover so that, when the cover and the case are mated, the molded recess portion and the partial heel form a half heel, the half heel being adapted to cooperate with a rigid tab in a panel board to provide a portion of a mounting means for the circuit breaker housing. A slot is provided at the far opposite end of the back of the cover so that, when the mating cover and the molded case are mated, the raised molded feature of the molded case is oriented intermediate the slot, the slot extending along the far opposite end of the cover from a position proximal to the back to a location between the front and the back of the cover. A groove is oriented along the exterior side of the cover from a position proximal to the back to a position intermediate the location and the front of the cover, the groove having a width at least as wide as the slot and being located adjacent to the slot distal from the far opposite end.

The connector system includes a spring clip of generally U-shape configuration having an outer leg, relatively stiff, with smoothly formed edges, a base of the clip being coupled to the outer leg, and an inner leg having portions removed so as to produce two flat springs joined by a portion of a flat leg, the flat leg being coupled to the base of the U-shaped spring clip, and being adapted to cooperate with the raised molded feature so as to rigidly position the base of the U-shaped spring clip and the outer leg relative to the circuit breaker housing.

The bus bar connector system includes a conductive contact member having an outer conductive leg commensurate in length and width with the outer leg of the spring clip so that when an inner surface of the outer leg of the spring clip is positioned opposite to a connecting surface of the outer conductive leg of the contact member and spaced therefrom, a bus bar blade can be received therebetween. The contact member includes a step having a riser along a first orthogonal direction that joins at a roundly formed right angle with one end of the leg so that the roundly formed angle and the smoothly formed edges serve as lead-in contours for the bus bar blade to be inserted therebetween, and a tread along a second orthogonal direction adapted to rest upon one of the two flat springs. The contact member includes a formed configuration having a first portion coupled to the other end of the leg and oriented in a direction parallel to the riser, a second portion coupled to the first portion, parallel to the riser, extending along a third orthogonal direction and a third portion coupled to the second portion and perpendicular thereto, adapted to house a fixed contact. The second portion has an aperture therewithin for receiving the other of the two flat springs.

The bus bar connector system further includes a second circuit breaker housing including a second molded case and a second mating cover. The second molded case has an opening in the front thereof for a second operating handle to pass therethrough. The second molded case has a molded recessed portion at one end of the back of the case forming a second half heel adapted to cooperate with the rigid tab of the panel board to provide a portion of a mounting means for the second circuit breaker housing. The first half heel and the second half heel are so oriented that when the housings are mated, the half heels form a full heel. The second molded case further includes a second groove oriented along the exterior side of the second case from a position proximal to the back to a second location intermediate the front of the second case and the back of the second case, the second groove having a width at least as wide as the first slot and being located along the far opposite end of the second case. A second slot is provided which extends along but is distal to the far opposite end of the second case from a position proximal to the back of the second case to a location intermediate the back and the second location. The second slot is located adjacent to the second groove distal from the far opposite end. The second mating cover has a second raised molded feature distal from the far opposite end of the back of the second cover so that when the second mating cover and the second molded case are mated, the second raised molded feature of the second mating cover is oriented intermediate the second slot.

The bus bar connector system further includes a second spring clip of generally U-shape configuration. That clip has an outer leg, relatively stiff, with smoothly formed edges. A base of the second U-shaped spring clip is coupled to the outer leg of the second spring clip, and an inner leg having portions removed so as to produce two flat springs joined by a portion of a flat leg is coupled to the base of the second U-shaped spring clip. The flat leg of the second spring clip is adapted to cooperate with the second raised molded feature so as to rigidly position the base of the second U-shaped spring clip and its outer leg relative to the second circuit breaker housing.

The bus bar connector system further includes a second conductive contact member which has an outer conductive leg commensurate in length and width with the outer leg of the second spring clip. Thus, when an inner surface of the outer leg of the second spring clip is positioned opposite to a connecting surface of the outer leg of the second member, and spaced therefrom, a bus bar blade can be received therebetween. The second conductive contact member includes a step. The step has a riser along a first orthogonal direction that joins at a roundly formed right angle with one end of the outer conductive leg of the second contact member, so that the latter-mentioned roundly formed right angle and the smoothly formed edges of the outer leg of the second contact member serve as lead-in contours for the bus bar blade to be inserted therebetween. The step includes a tread along a second orthogonal direction adapted to rest upon one of the two flat springs of the second spring clip, and the step further includes an x-y-z plane body having a first portion coupled to the other end of the leg of the second contact member and is oriented in a direction parallel to the riser of the second contact member. The x-y-z plane body has a second portion coupled to the first portion of the second contact member, parallel to the riser of the second contact member, extending along a third orthogonal direction. The x-y-z plane body further includes a third portion coupled to the second portion of the second contact member and perpendicular thereto adapted to house a second fixed contact. The second portion of the second contact member has an aperture therewithin for receiving the other of the two flat springs of the second spring clip.

BRIEF DESCRIPTION OF THE DRAWINGS

Other objects, advantages and features of this invention, together with its construction and mode of operation, will become more apparent from the following description, when read in conjunction with the accompanying drawings, in which.

DESCRIPTION OF PREFERRED EMBODIMENT

Figures 1, 10A, 10B, 12:
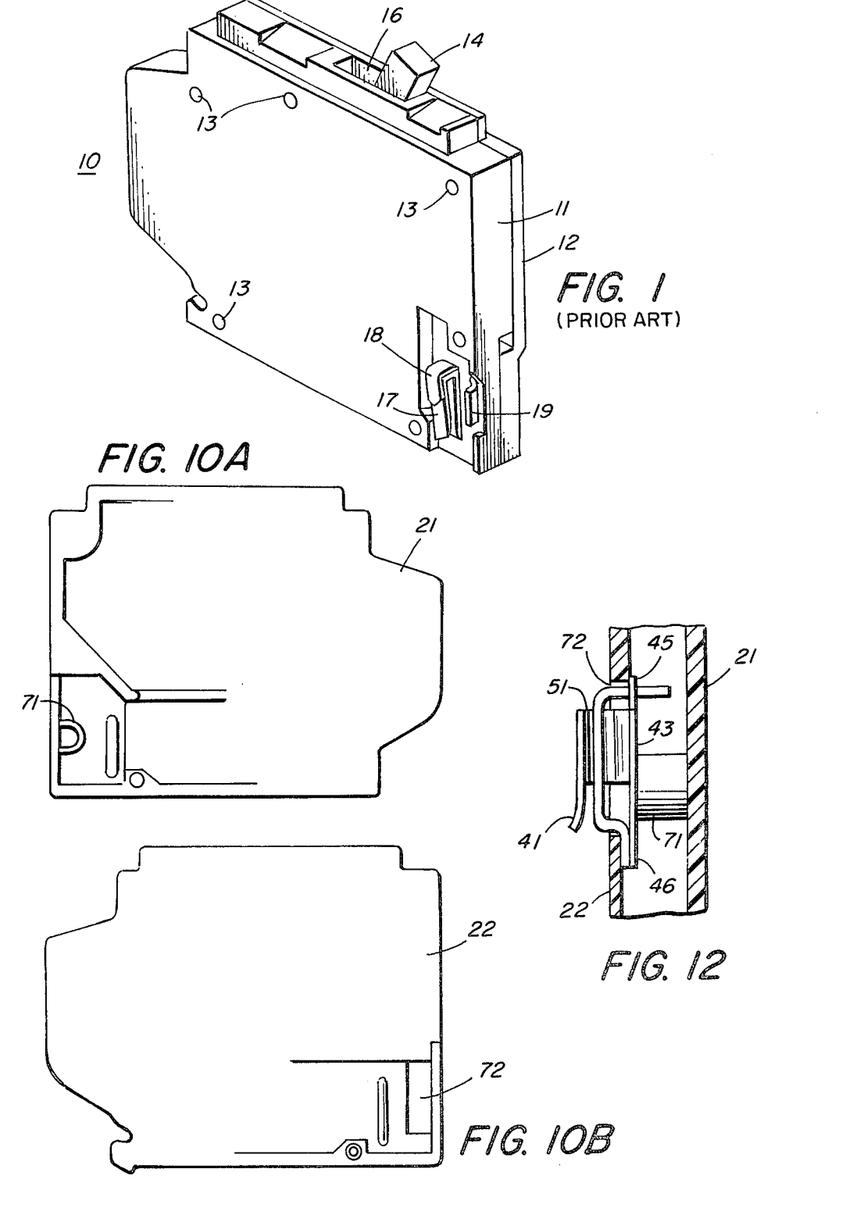
FIG. 1 is a perspective view of a prior art circuit breaker.
FIGS. 10a and 10b are views of the case and cover, respectively, of the circuit breaker housing depicted in FIG. 2.
FIG. 12 is a cross-sectional view taken along the line 12—12 of FIG. 2.

Referring to FIG. 1, there is depicted a perspective view of the prior art, low voltage, residential type circuit breaker of the one-half-inch variety. This circuit breaker, designated 10 in the drawing, includes a case 11 and a cover 12 which is held together by a plurality of rivets 13, 13. As is customary, the circuit breaker 10 is provided with an operating handle 14 which extends through an opening 16 of the circuit breaker 10.

Figures 2, 3, 4, 5, 6:
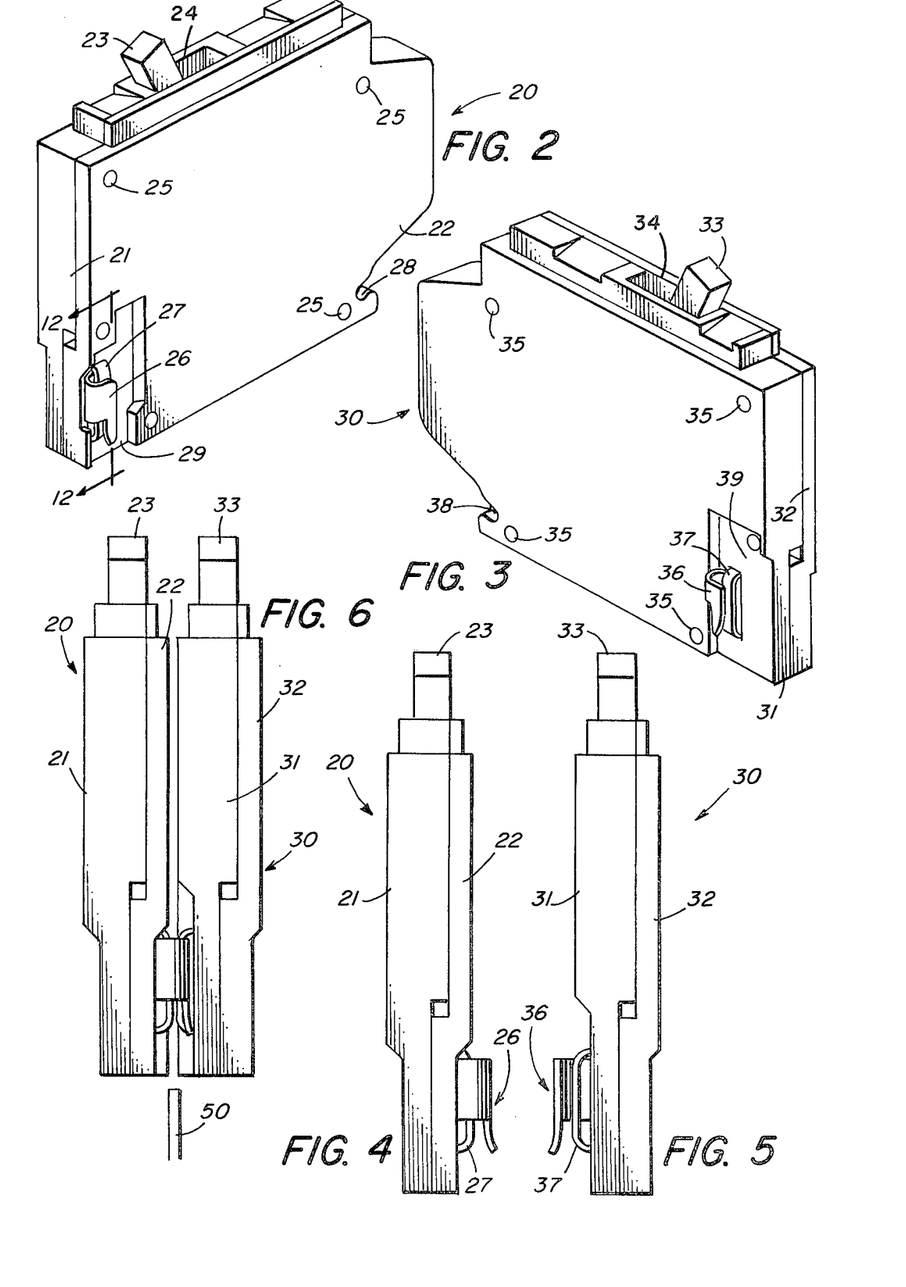
FIG. 2 is a perspective view of a circuit breaker, in accordance with one embodiment of the invention, adapted to be mounted to the left of a bus bar blade.
FIG. 3 is a perspective view of a circuit breaker, in accordance with an embodiment of the invention, adapted to be mounted to the right of the bus bar blade in common with the circuit breaker depicted in FIG. 2.
FIG. 4 is an end view of the circuit breaker depicted in FIG. 2.
FIG. 5 is an end view of the circuit breaker depicted in FIG. 3.
FIG. 6 is an end view of the circuit breakers of FIGS. 2 and 3 mounted together.

The prior art circuit breaker 10 is typically provided with a copper contact 17, a high carbon steel back up spring 18, which is applied against the contact 17, together with a case hardened circuit limiting reject tab 19. Referring to FIGS 2 and 3, there is depicted views of a pair of low voltage residential type circuit breakers 20, 30. The circuit breaker 20 is adapted to be applied to the left of a bus bar blade (not shown), whereas the circuit breaker 30 is adapted to be coupled to the right of such bus bar blade.

The circuit breakers 20 and 30 are similar in a number of respects and dissimilar in a few. The circuit breakers 20 and 30 are provided with molded insulated hollow cases 21, 31, respectively, together with corresponding mated covers 22, 32, respectively. The circuit breakers 20 and 30 therein contain an individual operating handle 23, 33, respectively, which extends from an appropriate opening 24, 34, respectively, from the cases 21, 31. A plurality of rivets 25, 25 maintain the cover 22 with its mating case 21 for the circuit breaker 20 whereas rivets 35, 35 maintain the cover 32 with respect to the mating case 31 of the circuit breaker 30. Both the circuit breaker 20 and the circuit breaker 30 are provided with separate individual respective spring clips 26, 36. The spring clips 26,36, being identical, are illustrated generally as 26 in FIGS. 7a, 7b, and 7c.

The circuit breakers 20 and 30 are also provided with conductive contact members 27, 37, respectively. The contact members 27 and 37 are similar but differ in that one of the portions thereof is somewhat of a mirror image with respect to its corresponding portion of the other component, as will become more apparent hereinafter.

FIG. 6 depicts the two circuit breakers 20 and 30 in side by side relationship so that they may engage against a blade 50 in an appropriate panel board. Both the circuit breaker 20 and the circuit breaker 30 are provided with partial heels 28, 38 at one end of the back of each of the circuit breakers so that they may be engageable with a rigid tab in a panel board so that the breakers can be pivoted against the blade 50.

The circuit breaker 20 is provided an elongate groove 29 which extends from a point proximate to the back of the circuit breaker 20 to a point intermediate the back and the front of the breaker 20 along the exterior surface of the cover 22. The groove extends along the exterior surface of the cover 22, adjacent to the spring clip 26 and the contact 27, but distal from the end of the circuit breaker 20. In similar but distinctively different fashion, the circuit breaker 30 is provided with a groove 39 which extends from the back of the circuit breaker to a point intermediate the back and the front of the circuit breaker along one end of the circuit breaker, whereas the spring clip 36 and the contact 37 are displaced near the back of the circuit breaker along the case 31, but distal from the edge at which the groove 39 is located.

Figure 7A:
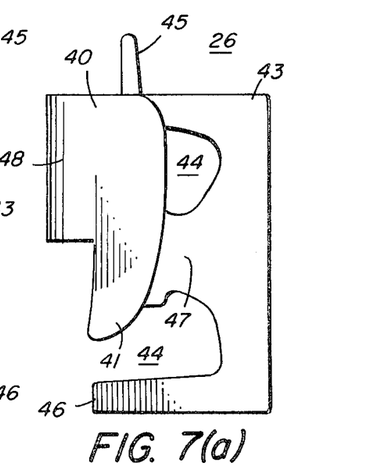
FIGS. 7a, 7b and 7c are front, back and side views, respectively, of a spring clip suitable for use in a bus bar connector system of this invention.
Figures 7B, 7C:
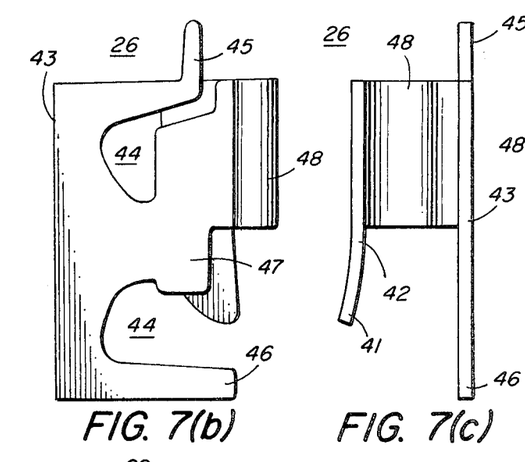

Referring now to FIGS. 7a, 7b and 7c, the spring clip 26 is generally of a U-shaped configuration. The legs of the U are distinctly different in the shape and function. The outer leg 40 is relatively stiff with smoothly formed edges 41 that serve as lead-in contours in conjunction with roundly formed features and smooth edges of the copper contact 27 as will be discussed more completely hereinafter. Accordingly, it is to be noted that the inside surface 42 of the outer leg 40 of the spring clip 26 is to be positioned opposite to the connecting surface 51 of the copper contact 27 and is spaced from the connecting surface of the copper contact 27 so as to receive a bus bar blade 50 therebetween.

The other leg 43 of the spring clip 26 is flat with portions 44, 44 removed so as to produce two flat springs 45, 46 which are joined by a portion of the flat leg 47 that is common to the base 48 of U-shape member 26.

The ends of the flat springs 45, 46 engage portions of the copper contact 27 so that, when a bus bar blade 50 is inserted between the outside leg 40 of the spring clip 26 and the copper contact 27, the flat springs 45, 46 are deflected, thereby producing a clamping force on the bus bar blade 50 and thereby performing an electrical connection.

It is noted that the copper contact 27 and bus bar blade 50 are clamped between the legs 40, 43 of the spring clip 26 and therefore the contact connecting force to the copper contact bus bar blade is produced independently of the molded plastic housing of the circuit breakers.

Referring to FIGS. 10a and 10b, there is shown a view of a case and cover, respectively, for the circuit breaker 20 in which the case contains a support 71 in the form of a raised molded feature at the far opposite end of the back of the case. The mating cover 22 contains a slot 72 at the far opposite end of the back of the cover so that, when the mating cover 22 and the molded case 21 are mated, the raised molded feature 71 in the case 21 is oriented intermediate to the slot 72.

Figure 9A:
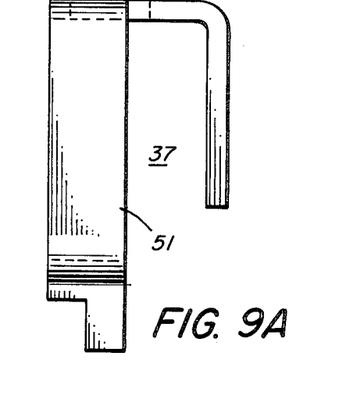
FIGS. 9a, 9b and 9c are front, side and top views, respectively, of a contact member suitable for use in the circuit breaker depicted in FIG. 2.
Figure 9B:
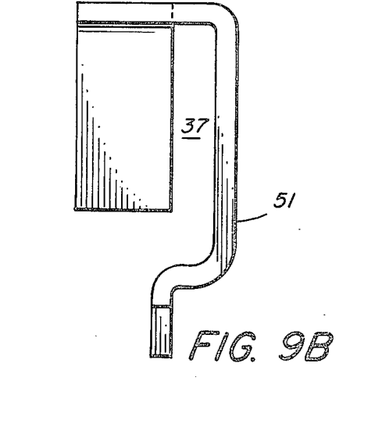
Figures 9C, 11A:
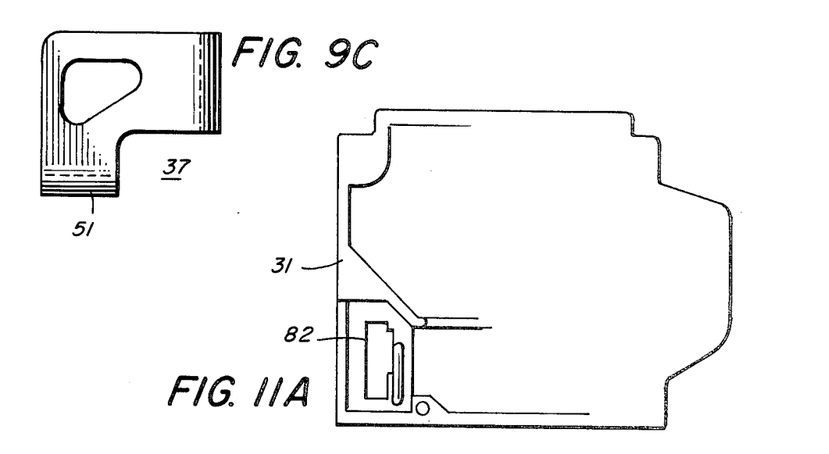
FIGS. 11a and 11b are views of the case and cover respectively of the circuit breaker housing depicted in FIG. 3.
Figure 11B:
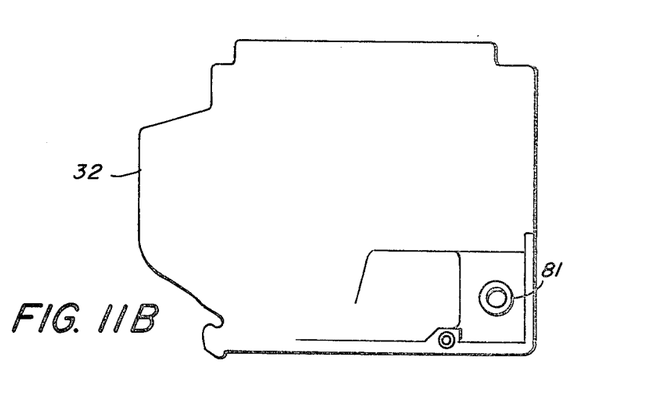

In similar fashion referring to FIGS. 11a and 11b, there is depicted a case 31 and a cover 32 respectively. The case 31 contains a slot 82, whereas the cover 32 contains a support or molded raised feature 81 which is oriented at a distance away from the far opposite end of the back of the breaker so that, when the mating cover 32 and the molded case 31 are mated, the raised molded feature 81 is oriented intermediate the slot 82.

In view of the foregoing, it is therefore noted that portions of the flat leg 43 cooperate with the molded features 71, 81, respectively, of the circuit breaker housing 20 and 30, respectively, in order to rigidly position the base 48 and the outside leg 40 of the spring clip 26 relative to the circuit breaker housing 20 and 30.

In use, the cooperating features of the housing 20, 30 and the copper contacts 27, 37 slightly displace the portion of the flat leg 43 that is common to both the flat springs 45, 46 and the base 48 of the U-shaped spring clip 26 so as to accurately produce the desired space between the outer leg 40 of the spring clip 26 and the connecting surface 51 of the copper contact 27. Such slight displacement produces a force that firmly holds the spring clip 26 within the locating features of the molded plastic housing 20 or 30.

As indicated above in the Summary of the Invention, the bus bar connector system for a pair of low voltage, residential type circuit breakers 20, 30 (FIGS. 2–6) comprise a first housing including the molded case 21 (FIG. 10A) and the mating cover 22 (FIG. 10B). The case 21 has an opening 24 in its front (top of FIG. 2) for the handle 23 to pass therethrough, the molded depress portion 28 at the right end (as viewed in FIG. 2) of the back of the case, forming the partial heel, and the raised molded feature 71 (FIGS. 10A and 12) at the left hand end (as viewed in FIG. 10A) of the back of the case. The mating cover 22 has the molded recessed portion 28 (FIGS. 2 and 10B) at one end of the back of the cover 22 so that, when the cover 22 and the case 21 are mated, the molded recess portion 28 and the partial heel form a half heel. When the mating cover 22 and the molded case 21 are mated, the raised molded feature 71 of the molded case 21 is oriented intermediate the slot 72 at the far opposite end of the back of the cover 22. The slot 72 extends along the far opposite end of the cover 22 from a position proximal to the back to a location between the front and the back of the cover 22 (FIG. 12). The groove 29, oriented along the exterior side of the cover 22 from a position proximal to the back to a position intermediate the location and the front of the cover 22, has a width at least as wide as the slot 72 and is located adjacent to the slot 72 distal from the far opposite end.

The connector system includes the spring clip 26 (FIGS. 7A, 7B, 7C) of generally U-shape configuration having an outer leg, relatively stiff, with smoothly formed edges, a base of the clip being coupled to the outer leg, and an inner leg having portions removed so as to produce two flat springs joined by a portion of a flat leg, the flat leg being coupled to the base of the U-shaped spring clip, and being adapted to cooperate with the raised molded feature so as to rigidly position the base of the U-shaped spring clip and the outer leg relative to the circuit breaker housing.

Figure 8A:
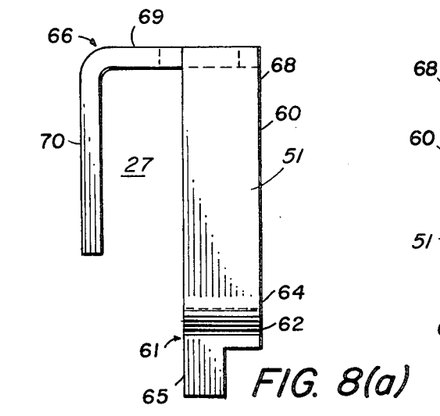
FIGS. 8a, 8b and 8c are front, side and top views, respectively, of a contact member suitable for use in the circuit breaker depicted in FIG. 3.
Figure 8B:
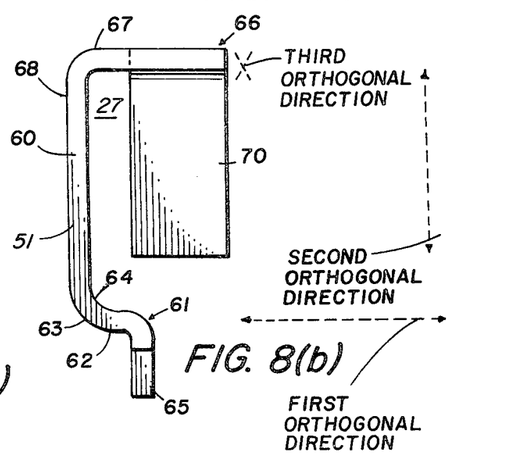

As shown in FIGS. 8(a), 8(b), the conductive contact member 27 has its outer conductive leg 60 commensurate in length and width with the outer leg of the spring clip so that when the inner surface 42 (FIG. 7C) of the outer leg 40 of the spring clip 26 is positioned opposite to a connecting surface 51 of the outer conductive leg 60 of the contact member 27 and spaced therefrom, a bus bar blade 50 can be received therebetween. The contact member 27 includes a step 61 having a riser 62 along a first orthogonal direction that joins at a roundly formed right angle 63 with one end 69 of the leg 60 so that the roundly formed angle 63 and the smoothly formed edges 41 serve as lead-in contours for the bus bar blade 50 to be inserted therebetween, and a tread 65 along a second orthogonal direction adapted to rest upon one of the two flat springs. The contact member 27 includes a formed configuration having a generally uniform thickness, as is evident from FIGS. 8(a) and 8(b). As the length (i.e., its longest dimension) of the member traverses three mutually perpendicular paths, the member could be termed an x-y-z plane body. The member 27 has a first portion 67 coupled to the other end 68 of the leg 60 and oriented in a direction parallel to the riser 62, a second portion 69 coupled to the first portion, parallel to the riser 62, extending along a third orthogonal direction and a third portion 70 coupled to the second portion 69 and perpendicular thereto, adapted to house a fixed contact. The second portion 69 has an aperture 78 therewithin for receiving the other of the two flat springs.

A second circuit breaker housing (FIG. 3) includes a second molded case 31 and a second mating cover 32. The second molded case 31 has an opening 34 in the front thereof (top, as viewed) for a second operating handle 33 to pass therethrough. A molded recessed portion 38 at one end of the back of the case 31 forms a second half heel adapted to cooperate with the rigid tab of the panel board to provide a portion of a mounting means for the second circuit breaker housing. The first half heel and the second half heel form a full heel. The second molded case 31 further includes a second groove 39 oriented along the exterior side of the second case 31 from a position proximal to the back to a second location intermediate the front of the second case 31 and the back of the second case 31, the second groove 39 having a width at least as wide as the first slot 72 (FIG. 10B)

and being located along the far opposite end of the second case 31. A second slot 82 FIG. 11(A) is provided which extends along but is distal to the far opposite end of the second case 31 from a position proximal to the back of the second case 31 to a location intermediate the back and the second location. The second slot 82 is located adjacent to the second groove 39 distal from the far opposite end. The second mating cover 32 has a second raised molded feature 81 (FIG. 11(B)) distal from the far opposite end of the back of the second cover 32 so that when the second mating cover 32 and the second molded case 31 are mated, the second raised molded feature 81 of the second mating cover 32 is oriented intermediate the second slot 82.

The bus bar connector system further includes a second spring clip 36 (FIG. 3) of generally U-shape configuration, similar to the first spring clip 26, FIG. 2.

Figure 8C:
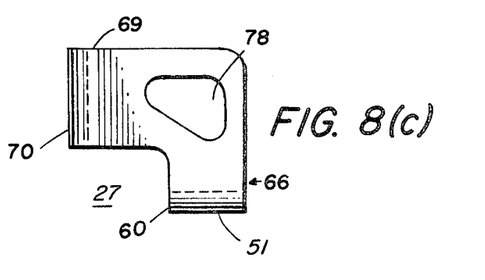

The system further includes the second conductive contact member 37 (FIGS. 9A, 9B, 9C) similar to the first conductive contact member 27 (FIGS. 8A, 8B, 8C), but differs in that one of the portions is oriented opposite to the corresponding portion of the other contact member. Whereas the first contact member 27 has a second portion 69 coupled to the first portion 67 parallel to the riser 62 extending along a third orthogonal direction to the left (as viewed in FIG. 8a), the second contact member 37 has its second portion coupled to the first portion parallel to the riser extending along a third orthogonal direction oppositely to the right as viewed in FIG. 9A.

Various modifications can be performed without departing from the spirit and scope of this invention.

What is claimed is:

1. A bus bar connector system for a low voltage, residential type circuit breaker comprising
   (A) a molded, hollow, circuit breaker housing having a front, a back, one side, an opposite side, one end, and an opposite end, including
      (1) a first opening in said front for an operating handle to pass therethrough,
      (2) a support within said housing at said one end of said back of said housing at said one side thereof; and
      (3) a second opening at said one end of said back of said housing at said opposite side thereof, so that said support at said one side is oriented intermediate said second opening at said opposite side, said second opening extending along said one end of said opposite side from a position proximal to said back to a location between said front and said back of said opposite side,
   (B) a spring clip of generally U-shape configuration having
      (1) an outer leg, relatively stiff, with smoothly formed edges, said outer leg having an inner surface,
      (2) a bight of said U-shaped spring clip, coupled to said outer leg, and
      (3) an inner leg, having portions removed so as to produce two flat springs joined by a portion of a flat leg, said flat leg being coupled to said bight of said U-shaped spring clip, said flat leg being adapted to cooperate with said support so as to rigidly position said bight of said U-shaped spring clip and said outer leg relative to said circuit breaker housing; and
   (C) a conductive contact member having
      (1) an outer conductive leg, having a connecting surface, one end, and an opposite end, commensurate in length and width with said outer leg of said spring clip so that when said inner surface of said outer leg of said spring clip is positioned opposite to said connecting surface of said outer conductive leg of said member, and spaced therefrom, a bus bar blade can be received therebetween,
      (2) a step having
         (i) a riser along a first orthogonal direction that joins at a roundly formed right angle with said one end of said conductive leg, so that said roundly formed right angle and said smoothly formed edges serve as "lead-in" contours for said bus bar blade to be inserted therebetween, said
         (ii) a tread along a second orthogonal direction adapted to rest upon one of said two flat springs, and
      (3) a formed configuration having
         (i) a first portion coupled to said other end of said conductive leg and oriented in a direction parallel to said riser,
         (ii) a second portion coupled to said first portion, parallel to said riser, extending along a third orthogonal direction, and
         (iii) a third portion, coupled to said second portion and perpendicular thereto, adapted to house a fixed contact,
            said second portion having an aperture therewithin for receiving the other of said two flat springs.

2. A bus bar connector system for a low voltage, residential type circuit breaker comprising
   (A) a molded, hollow, circuit breaker housing having a front, a back, one side, an opposite side, one end, and an opposite end, including
      (1) an opening in said front for an operating handle to pass therethrough,
      (2) a slot extending along but distal to said one end of said one side of said housing from a position proximal to said back to a location intermediate said back and said front, and
      (3) a support within said housing distal from said one end of said back so that said support is oriented intermediate said slot;
   (B) a spring clip of generally U-shape configuration having
      (1) an outer leg, relatively stiff, with smoothly formed edges, said outer leg having an inner surface,
      (2) a base of said U-shaped spring clip, coupled to said outer leg of said spring clip, and
      (3) an inner leg, having portions removed so as to produce two flat springs joined by a portion of a flat leg which is coupled to said base of said U-shaped spring clip, said flat leg of said spring clip being adapted to cooperate with said support so as to rigidly position said base of said U-shaped spring clip and said outer leg thereof relative to said circuit breaker housing; and
   (C) a conductive contact member having
      (1) an outer conductive leg, having a connecting surface, one end, and an other end, commensurate in length and width with said outer leg of said spring clip so that when said inner surface of said outer leg of said spring clip is positioned opposite to said connecting surface of said outer conductive leg of said member, and spaced therefrom, a bus bar blade can be received therebetween;

(2) a step having
(i) a riser along a first orthogonal direction that joins at a roundly formed right angle with said one end of said outer conductive leg, so that said latter-mentioned roundly formed right angle and said smoothly formed edges of said outer leg serve as "lead-in" contours for said bus bar blade to be inserted therebetween, and
(ii) a tread along a second orthogonal direction adapted to rest upon one of said two flat springs of said spring clip, and (3) a formed configuration having
(i) a first portion coupled to said other end of said conductive leg and oriented in a direction parallel to said riser,
(ii) a second portion coupled to said first portion, parallel to said riser, extending along a third orthogonal direction, and
(iii) a third portion, coupled to said second portion and perpendicular thereto, adapted to house a fixed contact,
said second portion having an aperture therewithin for receiving the other of said two flat springs.

3. A bus bar connector system for a low voltage, residential type circuit breaker comprising
(A) a molded, hollow, circuit breaker housing having a front, a back, one side, an opposite side, one end, and an opposite end, including
(1) an opening in said front for an operating handle to pass therethrough,
(2) a raised molded feature therewithin at said one end of said back of said housing at said one side thereof; and
(3) a slot at said one end of said back at said opposite side thereof, so that said raised molded feature at said one side is oriented intermediate said slot at said opposite side, said slot extending along said one end of said opposite side from a position proximal to said back to a location between said front and said back of said opposite side, (B) a spring clip of generally U-shape configuration having
(1) an outer leg, relatively stiff, with smoothly formed edges, said outer leg having an inner surface,
(2) a base of said U-shaped spring clip, coupled to said outer leg, and
(3) an inner leg, having portions removed so as to produce two flat springs joined by a portion of a flat leg, said flat leg being coupled to said base of said U-shaped spring clip, said flat leg being adapted to cooperate with said raised molded feature so as to rigidly position said base of said U-shaped spring clip and said outer leg relative to said circuit breaker housing; and (C) a conductive contact member having
(1) an outer conductive leg, having a connecting surface, one end and an other end, commensurate in length and width with said outer leg of said spring clip so that when said inner surface of said outer leg of said spring clip is positioned opposite to said connecting surface of said outer conductive leg of said member, and spaced therefrom, a bus bar blade can be received therebetween, (2) a step having
(i) a riser along a first orthogonal direction that joins at a roundly formed right angle with said one end of said conductive leg, so that said roundly formed right angle and said smoothly formed edges serve as "lead-in" contours for said bus bar blade to be inserted therebetween, and
(ii) a tread along a second orthogonal direction adapted to rest upon one of said two flat springs, and (3) a formed configuration having
(i) a first portion coupled to said other end of said conductive leg and oriented in a direction parallel to said riser,
(ii) a second portion coupled to said first portion, parallel to said riser, extending along a third orthogonal direction, and
(iii) a third portion, coupled to said second portion and perpendicular thereto, adapted to house a fixed contact,
said second portion having an aperture therewithin for receiving the other of said two flat springs.

4. A bus bar connector system for a low voltage, residential type circuit breaker comprising
(A) a molded, hollow, circuit breaker housing having a front, a back, one side, an opposite side, one end, and an opposite end, said opposite side having an external surface, including
(1) an opening in said front for an operating handle to pass therethrough;
(2) a raised molded feature therewithin at said opposite end of said back of said housing at one side thereof;
(3) a slot at said opposite end of said back at said opposite side thereof, so that said raised molded feature at said one side is oriented intermediate said slot, said slot extending along said opposite end of said opposite side from a position proximal to said back to a location between said front and said back of said opposite side, and
(4) a groove, oriented along said exterior surface of said opposite side, from a position proximal to said back to a position intermediate said location and said front of said opposite side, said groove having a width at least as wide as said slot and being located adjacent said slot distal from said opposite end;

(B) a spring clip of generally U-shape configuration having
(1) an outer leg, relatively stiff, with smoothly formed edges, said outer leg having an inner surface,
(2) a base of said U-shaped spring clip, coupled to said outer leg, and
(3) an inner leg, having portions removed so as to produce two flat springs joined by a portion of a flat leg, said flat leg being coupled to said base of said U-shaped spring clip, said flat leg being adapted to cooperate with said raised molded feature so as to rigidly position said base of said U-shaped spring clip and said outer leg relative to said circuit breaker housing; and (C) a conductive contact member having (1) an outer conductive leg, having a connecting surface, commensurate in length and width with said outer leg of said spring clip so that when said inner surface of said outer leg of said spring clip is positioned opposite to said connecting surface of said outer conductive leg of said member, and spaced therefrom, a bus bar blade can be received therebetween, (2) a step having
  (i) a riser along a first orthogonal direction that joins at a roundly formed right angle with said one end of said conductive leg, so that said roundly formed right angle and said smoothly formed edges serve as "lead-in" contours for said bus bar blade to be inserted therebetween, and
  (ii) a tread along a second orthogonal direction adapted to rest upon one of said two flat springs, and (3) a formed configuration having
  (i) a first portion coupled to said other end of said conductive leg and oriented in a direction parallel to said riser,
  (ii) a second portion coupled to said first portion, parallel to said riser, extending along a third orthogonal direction, and
  (iii) a third portion, coupled to said second portion and perpendicular thereto, adapted to house a first fixed contact,
    said second portion having an aperture therewithin for receiving the other of said two flat springs.

5. A bus bar connector system for a low voltage, residential type circuit breaker comprising (A) a molded, hollow, circuit breaker housing having a front, a back, one side, an opposite side, one end, and an opposite end, said one side having an exterior surface, including
  (1) an opening in said front for an operating handle to pass therethrough,
  (2) a groove, oriented along said exterior surface at said one side thereof, from a position proximal to said back to a location intermediate said front and said back thereof, said groove being located along said opposite end of said one side thereof;
  (3) a slot extending along but distal to said opposite end of said housing at said one side thereof from a position proximal to said back of said housing to a location intermediate said back and said location, said slot being located adjacent said groove distal from said opposite end, said groove having a width at least as wide as said slot; and
  (4) a raised molded feature therewithin distal from said opposite end of said back of said opposite side thereof so that said raised molded feature of said housing is oriented intermediate said slot;

(B) a spring clip of generally U-shape configuration having
  (1) an outer leg, relatively stiff, with smoothly formed edges, said outer leg having an inner surface,
  (2) a base of said U-shaped spring clip, coupled to said outer leg of said spring clip, and
  (3) an inner leg, having portions removed so as to produce two flat springs joined by a portion of a flat leg which is coupled to said base of said U-shaped spring clip, said flat leg of said spring clip being adapted to cooperate with said raised molded feature so as to rigidly position said base of said U-shaped spring clip and said outer leg thereof relative to said circuit breaker housing; and (C) a conductive contact member having
  (1) an outer conductive leg, having a connecting surface, one end, and an other end, commensurate in length and width with said outer leg of said spring clip so that when said inner surface of said outer leg of said spring clip is positioned opposite to said connecting surface of said outer conductive leg of said member, and spaced therefrom, a bus bar blade can be received therebetween;
  (2) a step having
    (i) a riser along a first orthogonal direction that joins at a roundly formed right angle with said one end of said conductive leg so that said roundly formed right angle and said smoothly formed edges serve as "lead-in" contours for a bus bar blade to be inserted therebetween, and
    (ii) a tread along a second orthogonal direction adapted to rest upon one of said two flat springs, and
  (3) a formed configuration having
    (i) a first portion coupled to said other end of said conductive leg and oriented in a direction parallel to said riser,
    (ii) a second portion coupled to said first portion, parallel to said riser, extending along a third orthogonal direction, and
    (iii) a third portion, coupled to said second portion and perpendicular thereto, adapted to house a fixed contact,
      said second portion having an aperture therewithin for receiving the other of said two flat springs.

* * * * *

UNITED STATES PATENT AND TRADEMARK OFFICE
CERTIFICATE OF CORRECTION

PATENT NO. : 4,468,547

DATED : August 28, 1984

INVENTOR(S) : Harold E. Belttary

It is certified that error appears in the above-identified patent and that said Letters Patent is hereby corrected as shown below:

Column 10, line 17, change "said" to --and--.

Signed and Sealed this

Nineteenth Day of February 1985

[SEAL]

Attest:

DONALD J. QUIGG

Attesting Officer     Acting Commissioner of Patents and Trademarks